United States Patent
Hughes

(10) Patent No.: US 10,609,853 B2
(45) Date of Patent: Apr. 7, 2020

(54) TILLAGE IMPLEMENT HAVING A MECHANISM FOR ADJUSTING DISC BLADE ANGLE

(71) Applicant: AGCO Corporation, Duluth, GA (US)

(72) Inventor: Jeffrey S. Hughes, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/316,313

(22) PCT Filed: Jul. 3, 2017

(86) PCT No.: PCT/IB2017/000810
§ 371 (c)(1),
(2) Date: Jan. 8, 2019

(87) PCT Pub. No.: WO2018/020307
PCT Pub. Date: Feb. 1, 2018

(65) Prior Publication Data
US 2019/0357416 A1    Nov. 28, 2019

Related U.S. Application Data

(60) Provisional application No. 62/366,194, filed on Jul. 25, 2016.

(51) Int. Cl.
*A01B 21/08* (2006.01)
*A01B 49/02* (2006.01)

(52) U.S. Cl.
CPC .......... *A01B 49/027* (2013.01); *A01B 21/086* (2013.01)

(58) Field of Classification Search
CPC .................................................. A01B 21/086
(Continued)

(56) References Cited

U.S. PATENT DOCUMENTS 410,573 A * 9/1889 Blakemore .......... A01B 21/086
172/569
876,145 A * 1/1908 Buchet et al. ....... A01B 21/086
172/569
(Continued)

FOREIGN PATENT DOCUMENTS

DE    10104911 A1 * 8/2002 .......... A01B 21/086
DE    103 36 652 A1    2/2005
(Continued)

OTHER PUBLICATIONS

European Patent Office, International Search Report for International Patent Application No. PCT/IB2017/000810, dated Jan. 2, 2018.
(Continued)

*Primary Examiner* — Matthew Troutman

(57) ABSTRACT

A gang assembly of a tillage implement has disc blades suspended from a support bar with a disc hanger assembly. A disc adjustment mechanism is configured to pivotably attach the disc hanger assembly for each of the plurality of disc blades to the support bar. The disc adjustment mechanism includes a pivot mount for each of the plurality of disc blades. Each pivot mount has a pivot configured to pivot the pivot mount, a first arm connected to the disc hanger assembly, and a crank arm. A shuttle is attached to the crank arms and causes each pivot mount to pivot and adjust the disc angle of the associated disc blade. The disc hanger assembly is configured to position the disc blade such that a vertical center line of the disc blade extends through the pivot point of the pivot.

7 Claims, 4 Drawing Sheets

(58) Field of Classification Search
USPC .................................... 172/569, 574, 576
See application file for complete search history.

(56) References Cited

U.S. PATENT DOCUMENTS

| | | | | |
|---|---|---|---|---|
| 1,026,912 | A * | 5/1912 | Hardt | A01B 3/40 |
| | | | | 172/221 |
| 4,333,535 | A | 6/1982 | Hentrich, Sr. | |
| 5,259,460 | A * | 11/1993 | Evers | A01B 49/02 |
| | | | | 172/569 |
| 5,458,203 | A * | 10/1995 | Evers | A01B 21/08 |
| | | | | 172/569 |
| 5,878,821 | A | 3/1999 | Flenker | |
| 10,238,022 | B2 * | 3/2019 | Gray | A01B 15/18 |
| 2008/0230243 | A1 | 9/2008 | Evin | |
| 2016/0198620 | A1 | 7/2016 | Depault | |

FOREIGN PATENT DOCUMENTS

| | | |
|---|---|---|
| WO | 92/06580 A1 | 4/1992 |
| WO | 2004/004438 A1 | 1/2004 |
| WO | 2014/056077 A1 | 4/2014 |

OTHER PUBLICATIONS

UK Intellectual Property Office, Search Report for related UK Application No. GB1613843.0, dated Feb. 9, 2017.

* cited by examiner

TILLAGE IMPLEMENT HAVING A MECHANISM FOR ADJUSTING DISC BLADE ANGLE

BACKGROUND OF THE INVENTION

Field of Invention

The present disclosure relates generally to an agricultural tillage implement, and more particularly, to a tillage implement with a mechanism to adjust the disc blade angle while keeping blade furrows uniform regardless of the blade angle.

Description of Related Art

Historically, farmers have always looked for ways to reduce cost, increase production and become more efficient with their time and money. One way to accomplish this is to increase the versatility of their equipment by making the equipment capable of performing multiple different operations.

For example, a tillage implement contains a set of rotating blades that cut and incorporate residue into the soil as the implement is pulled through the field by a tractor. Most often, the blades are mounted on a common shaft creating a "gang." The gang is then mounted to an over-frame tube or structure that in turn is mounted to the basic frame. This assembly is mounted to the frame in such a way that allows the structure/tube and the affixed gang to rotate. In order make the tillage implement more versatile, manufacturers have designed ways to change the gang angle in relationship with the direction of travel to adjust the aggressiveness of the implement. This allows the gang angle to be increased for primary tillage and decreased for secondary operations. In theory the farmer has the expense of one tillage tool but the one tool is capable of doing two completely different operations.

One problem with such current tillage implements is as the gang angle is adjusted, the slots or furrows created by the blades will move in relationship to not only the tires and other gangs of the implement, but in relationship with the other blades on the gang itself. This lateral movement of the furrows creates undesirable non-uniform conditions in the field.

BRIEF SUMMARY OF THE INVENTION

Briefly stated, one aspect of the invention is directed to an agricultural tillage implement having a main frame and configured to be pulled in a direction of motion through a field. The tillage implement includes at least one gang assembly having a plurality of disc blades. The gang assembly has a transverse support bar attached to the main frame. Each of the plurality of disc blades is suspended from the support bar with a disc hanger assembly. The tillage implement has a disc adjustment mechanism configured to pivotably attach the disc hanger assembly for each of the plurality of disc blades to the support bar so that a disc angle of the disc blades relative the direction of motion may be adjusted. The disc adjustment mechanism includes a pivot mount for each of the plurality of disc blades. Each pivot mount has a pivot connected to the support bar and configured to pivot the pivot mount about a pivot point, a first arm connected to the disc hanger assembly, and a crank arm extending from the pivot. The disc adjustment mechanism has a shuttle, wherein the crank arms of each of the pivot mounts are attached to the shuttle such that movement of the shuttle causes each pivot mount to pivot and adjust the disc angle of the associated disc blade. An actuator is configured to move the shuttle relative the support bar in order to position the crank arms for each of the disc blades. The disc hanger assembly is configured to position the disc blade such that a vertical center line of the disc blade extends through the pivot point of the pivot such that furrows created by the plurality of disc blades do not move laterally relative one other when the disc angles of the disc blades are adjusted.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF PREFERRED EMBODIMENTS

Figure 1:
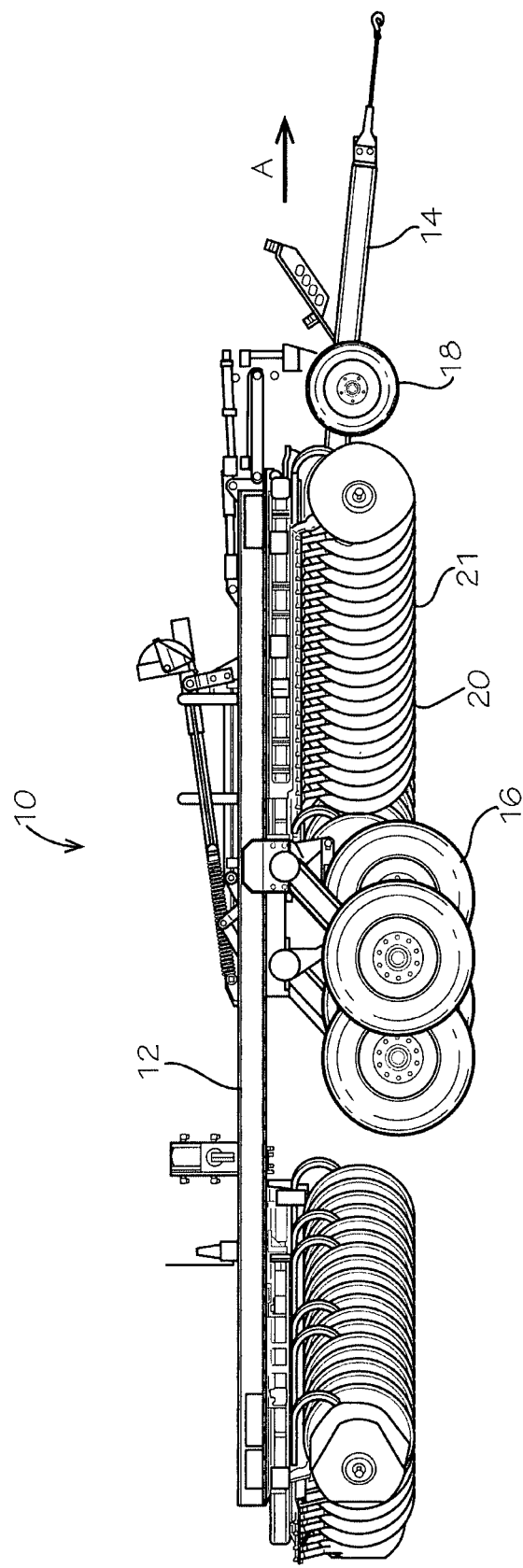
FIG. 1 is a perspective view of an agricultural tillage implement.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates an agricultural tillage implement, generally indicated at 10. An agricultural vehicle such as a tractor pulls the implement 10 in a direction of motion A. The implement 10 includes a main frame 12 having a hitch 14 on the front end that may be used to connect the implement 10 to the agricultural vehicle. A set of center wheels 16 is attached across the main frame 12 at positions, for example, roughly midway between the front and rear ends of the main frame 12 which support the implement 10 as well as providing depth adjustment, in a known manner. Additionally, a set of pivoting wheels 18 is connected to front distal ends of the main frame 12 in a known manner.

The implement 10 also includes a plurality of disc blades 20 attached to the main frame 12 in one or more gang assemblies 21. The gang assemblies 21 may be arranged in any suitable arrangement such as with front and rear wings such that the ground is engaged by the plurality of disc blades 20 as the implement 10 is pulled in the direction of motion A by the agricultural vehicle.

Figure 2:
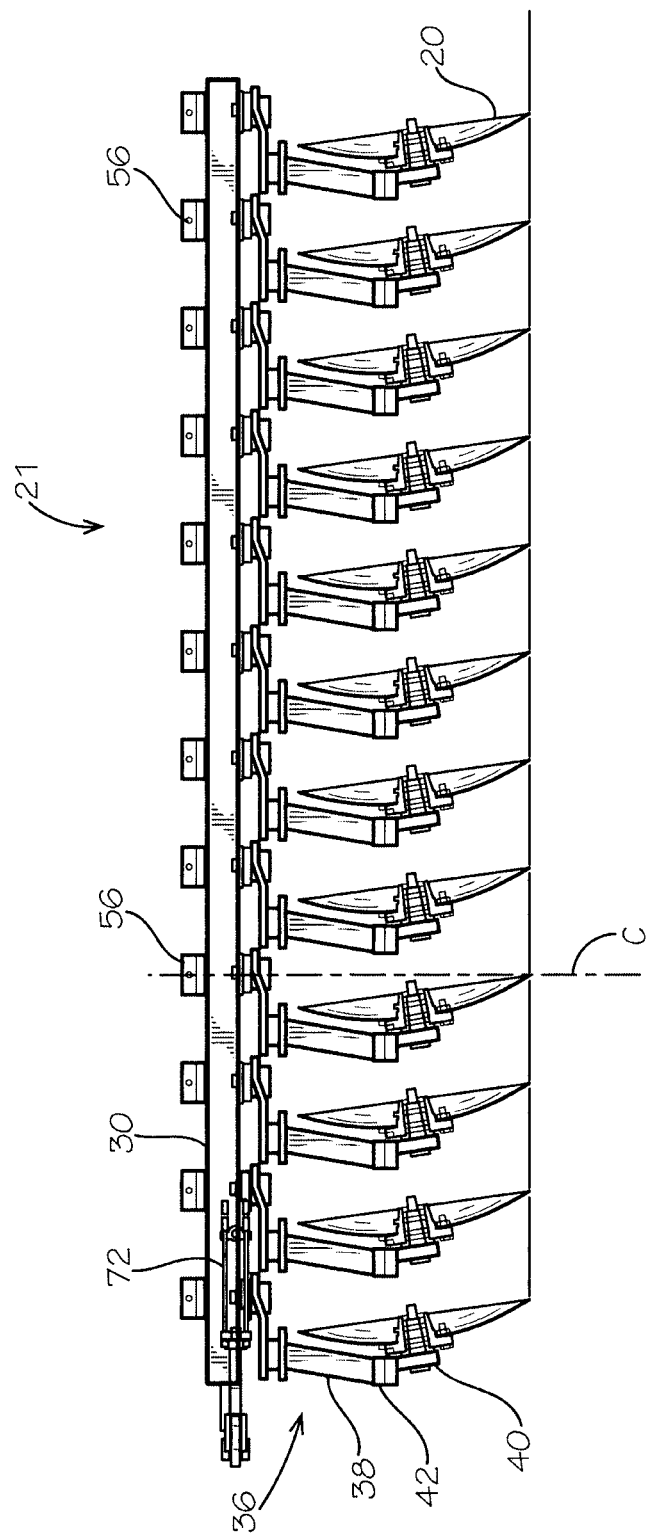
FIG. 2 is a front elevation of a gang assembly of the implement of FIG. 1.
Figure 3:
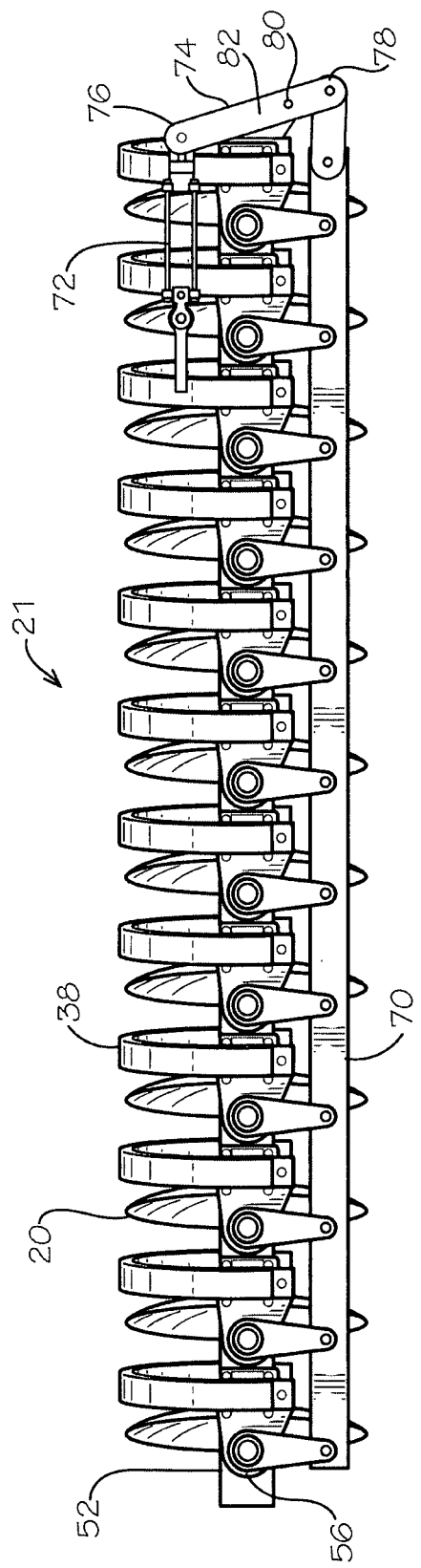
FIG. 3 is a plan view of the gang assembly of the implement of FIG. 2.

Turning also now to FIGS. 2 and 3, each gang assembly 21 includes a transverse gang bar 30 extending substantially the length of the gang assembly. The gang bar 30 is attached to the main frame 12. In one application the gang bar is set at an angle to direction of travel A, but the gang bar could be positioned perpendicular to the direction of travel A if so desired. The gang assembly 21 includes a plurality of the disc blades 20 suspended from and substantially equally-spaced along the length of the gang bar 30. Each disc blade 20 is suspended from the gang bar 30 using a disc hanger assembly 36. It is desirable that the disc blades 20 be resiliently mounted to the gang bar 30 to prevent the disc blades 20 from being damaged or broken when striking an obstacle, such as a large rock in the field. The disc hanger assembly 36 allows the disc blades 20 freedom to move vertically, laterally and/or torsionally away from obstacles and hard spots to avoid damage to the disc blades 20. One suitable disc hanger assembly 36 uses a C-shaped flex spring 38 as shown in commonly assigned U.S. Pat. RE38,974 entitled Agricultural Disc Mounting System and Method. A hub 40, comprising a suitable bearing, mounts the disc blade 20 to a lower leg 42 of the flex spring 38 to allow rotation of the disc blade 20. Desirably, the hub 40 is conventional in nature and would be understood by those skilled in the art and thus need not be described in further detail. Other means for mounting the disc blades 20 to the gang bar 30 may be contemplated using sound engineering judgment.

Figure 4:
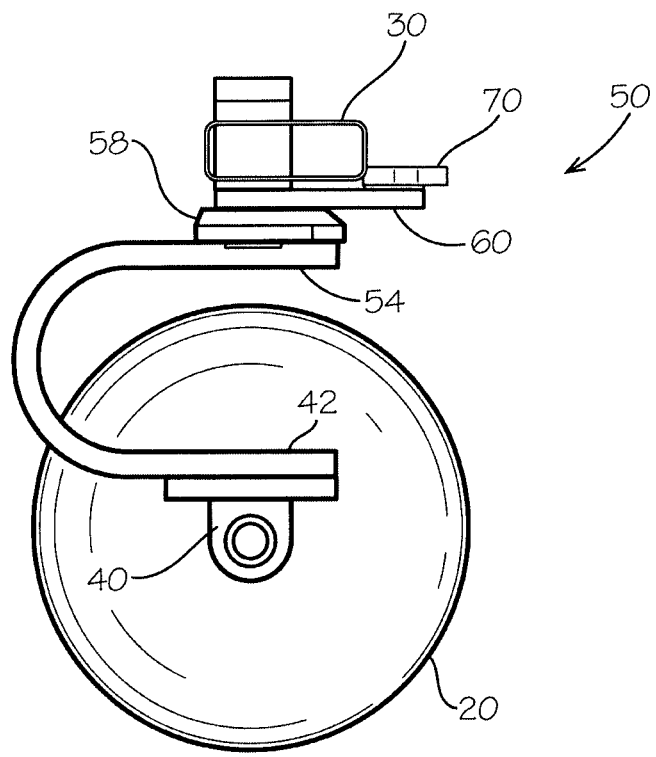
FIG. 4 is a side view of one of the disc blades of the gang assembly of the implement and associated hanger and pivot mount.
Figure 5:
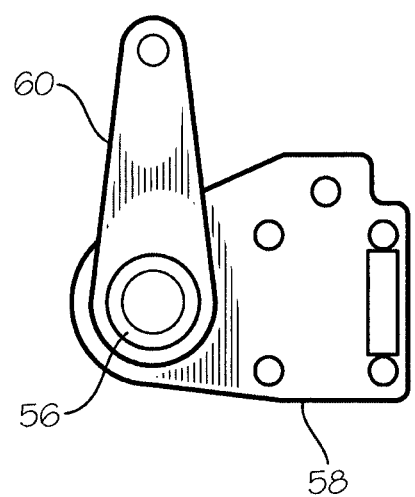
FIG. 5 is a plan view of the pivot mount of FIG. 4.

According to the invention, a disc adjustment mechanism 50 pivotably attaches the flex spring 38 for each disc blade 20 to the support bar 30 so that a disc angle of the disc blades 20 relative the direction of motion A may be adjusted to modify the aggressiveness of the disc blade 20 as the implement 10 moves through the field. Turning also now to FIGS. 4 and 5, the disc adjustment mechanism 50 comprises a pivot mount 52 for each of the disc blades 20 that connects an upper leg 54 of the flex spring 38 to the gang bar 30. Each pivot mount 52 is connected to the support bar 30 with a pivot 56. A first arm 58 of the pivot mount 52 is connected to the upper leg 44 of the flex spring 44 using a bolted or other suitable connection. The pivot mount 52 also has a crank arm 60 extending from the pivot 56. In the illustrated embodiment, the first arm 58 and the crank arm 60 are welded together to form the pivot mount 52. Alternately, the pivot mount 52 may be formed as a single cast or stamped component.

In one embodiment, the pivot 56 comprises a pivot pin 62 extending through the support bar 30 and the pivot mount 52 enabling the pivot mount 52 to rotate about the pivot 56 when an actuation force is applied to the crank arm 60. Pivoting movement of the pivot mount 52 causes the flex spring 38 and the disc blade 20 mounted thereon to pivot with respect to the support bar 30. Desirably, the flex spring 38 is configured to position the disc blade 20 such that a vertical center line C of the disc blade 20 is positioned directly below the pivot point of pivot 56 as can be seen in FIG. 2. Thus, throughout the entire range of rotation of the disc blades 20, the slot or furrows created by the disc blades 20 do not move laterally relative each other since the ground engagement portion of each of the disc blades 20 is consistently directly below its pivot 56.

The disc adjustment mechanism 50 has a shuttle 70 that attaches to the crank arms 60 of each of the pivot mounts 52. In the illustrated embodiment, the shuttle 70 is an elongate member substantially parallel to and extending the length of the gang assembly 21. In this embodiment, back and forth movement of the shuttle 70 causes each pivot mount 50 to pivot and adjust the disc angle of the disc blades 20. An actuator 72 is configured to move the shuttle 70 relative the support bar 30 in order to position the crank arms 60 for each of the disc blades 20. In the illustrated embodiment, a lever 74 having one end 76 connected to the actuator 70 and a second end 78 connected to the shuttle 70 is configured to pivot about a fulcrum 80 formed by a tab 82 on the support bar 30. However, other means to connect the actuator 72 to the shuttle 70 to enable requisite movement of the crank arms 60 may be used using sound engineering judgment. While the illustrated embodiment has a single actuator 72 controlling the position of all of the disc blades 20 of a gang assembly 21, one skilled in the art will understand that the disc blades 20 on the gang assembly 21 may be broken up into groups with each group having a separate actuator 72 without departing from the scope of the invention.

This invention allows for the gang angles of the disc blades 20 to be changed without the adverse effects created by rotating the entire support bar 30 of the gang assembly 21. Throughout the entire range of rotation, the slot or furrows created by the disc blades 20 does not move laterally since a vertical center line of the disc blade 20 is positioned directly below the pivot point of pivot 56. Also, since the furrows or slots do not move relative the implement 10, it is possible to place a secondary tillage tool (e.g., a shank, or rolling tine etc.) directly behind the disc blades 20 and have the tool operate in the furrow or slot regardless of the gang angle.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. An agricultural tillage implement, comprising:
a main frame configured to be pulled through a field;
a support bar attached to the main frame;
a plurality of disc blades, each suspended from the support bar by one of a plurality of disc hanger assemblies;
a plurality of pivot mounts, each pivot mount comprising a first arm connected to the disc hanger assembly and a crank arm extending from the pivot, each pivot mount connected to the support bar and configured to rotate the pivot mount about a pivot point;

a shuttle attached to the crank arms of each of the pivot mounts such that movement of the shuttle causes each pivot mount to rotate and adjust a disc angle of the associated disc blade; and an actuator configured to move the shuttle relative the support bar;

wherein each disc hanger assembly comprises a flex spring, each flex spring having a lower leg on which the associated disc blade is mounted and an upper leg connected to the first arm of the associated pivot mount, and wherein each disc hanger assembly is configured to position the associated disc blade such that a vertical center line of the associated disc blade extends through the pivot point of the pivot such that a point at which each disc contacts the field remains directly below the pivot point of the associated pivot mount when the disc angles of the disc blades are adjusted.

2. The agricultural tillage implement of claim 1, wherein the pivot mount comprises a pin extending through the support bar and the pivot mount to enable the pivot mount to rotate about the pin when an actuation force is applied to the crank arm such that rotation of the pivot mount causes the flex spring and the disc blade mounted thereon to rotate with respect to the support bar.

3. The agricultural tillage implement of claim 1, wherein the support bar is mounted on the frame at an angle less than 90 degrees relative to a direction of travel.

4. The agricultural tillage implement of claim 1, wherein the shuttle is an elongate member substantially parallel to and extending a length of the support bar.

5. The agricultural tillage implement of claim 1, wherein each first arm is welded to the associated crank arm.

6. The agricultural tillage implement of claim 1, wherein each pivot mount comprises a single cast or stamped component comprising the first arm and the crank arm.

7. The agricultural tillage implement of claim 1, wherein the flex spring comprises a C-shaped flex spring.

\* \* \* \* \*